United States Patent
Chou

(10) Patent No.: US 6,816,922 B2
(45) Date of Patent: Nov. 9, 2004

(54) DIGITAL SIGNAL PROCESSOR WITH A BYTE DMA CONTROLLER

(75) Inventor: Kuei-yi Chou, Hsinchu (TW)

(73) Assignee: Faraday Technology Corp., Hsinchu (TW)

( * ) Notice: Subject to any disclaimer, the term of this patent is extended or adjusted under 35 U.S.C. 154(b) by 0 days.

(21) Appl. No.: 10/412,411

(22) Filed: Apr. 14, 2003

(65) Prior Publication Data

US 2004/0205264 A1 Oct. 14, 2004

(51) Int. Cl.[7] .............................................. G06F 13/28
(52) U.S. Cl. ......................... 710/22; 710/23; 710/308; 710/113; 711/102; 711/103
(58) Field of Search ............................. 710/22–34, 308, 710/113–118; 711/102–103

(56) References Cited

U.S. PATENT DOCUMENTS 5,825,878 A * 10/1998 Takahashi et al. .......... 713/190
6,310,921 B1 * 10/2001 Yoshioka et al. ...... 375/240.26
6,629,161 B2 * 9/2003 Matsuki et al. ............... 710/22

* cited by examiner

Primary Examiner—Jeffrey Gaffin
Assistant Examiner—Mike Nguyen
(74) Attorney, Agent, or Firm—Law Offices of David Pai; Chao-Chang David Pai

(57) ABSTRACT

A digital signal processor includes a byte direct memory access (DMA) controller and an external memory controller, both of which are coupled to each other. The external memory controller is coupled to a byte memory and other external memories through a common data bus. The byte DMA controller performs a byte DMA operation to the byte memory through the common data bus by controlling the external memory, thereby avoiding an additional data bus. As a result, the digital signal processor according to the present invention has less connecting terminals and achieves a size reduction.

11 Claims, 2 Drawing Sheets

DIGITAL SIGNAL PROCESSOR WITH A BYTE DMA CONTROLLER

BACKGROUND OF THE INVENTION

1. Field of the Invention

The present invention relates to a digital signal processor and, more particularly, to a digital signal processor with a byte direct memory access (DMA) controller.

2. Description of the Related Art

In a digital signal processor system employing static random access memories (SRAMs) as internal memories, in order for the digital signal processor either to execute a certain program immediately after the system is booted or to perform background loading/saving operations during program execution, the most commonly used procedure is as follows. At first, the certain program to be executed immediately after the system is booted is stored in a byte memory installed outside the digital signal processor, such as a read only memory or flash memory. Subsequently, a byte DMA controller installed inside the digital signal processor downloads the certain program from the external byte memory into the SRAM type internal memories for being executed therein.

FIG. 1 is a circuit block diagram showing a conventional digital signal processor. Referring to FIG. 1, the conventional digital signal processor 10 includes a byte DMA controller 11 and an external memory controller 12. Through a dedicated data bus 13, the byte DMA controller 11 directly accesses a byte memory 14. On the other hand, the external memory controller 12 accesses external memories 16 and 17 through another data bus 15.

As can be clearly seen from FIG. 1, the conventional digital signal processor 10 must employ two different data buses 13 and 15 for the byte DMA controller 11 and the external memory controller 12 in order to access the byte memory 14 and the external memories 16 and 17, respectively. Therefore, the conventional digital signal processor 12 needs to be provided with a number of connecting terminals for coupling with the data buses 13 and 15, resulting in a restriction on the size reduction of the conventional digital signal processor 10.

SUMMARY OF THE INVENTION

In view of the above-mentioned problem, an object of the present invention is to provide a digital signal processor with a byte DMA controller capable of accessing a byte memory and an external memory through a common data bus, thereby reducing a necessary number of connecting terminals of the digital signal processor.

According to one aspect of the present invention, a digital signal processor is provided for coupling with a byte memory and an external memory through a common data bus, including an internal memory, an external memory controller, a byte DMA controller, and a steal request priority scheduler. In the internal memory is stored at least one word, each of which consists of a plurality of bytes. The external memory controller is coupled with the common data bus. The byte DMA controller is coupled with the external memory controller and includes: a byte DMA steal request circuit for outputting a write steal request; a data buffer coupled with the internal memory for receiving in format of a word the at least one word stored in the internal memory during an execution of the write steal request; a byte DMA request circuit for outputting a write request into the external memory controller after the data buffer has received the at least one word stored in the internal memory; and a byte DMA waiting circuit for periodically outputting a waiting end signal into the external memory controller. The steal request priority scheduler receives the write steal request and makes a schedule for the execution of the write steal request. The external memory controller makes a schedule for an execution of the write request. During the execution of the write request, the external memory controller in response to the waiting end signal transfers in format of a byte the at least one word from the data buffer through the common data bus into the byte memory.

According to another aspect of the present invention, a digital signal processor is provided for coupling with a byte memory and an external memory through a common data bus. In the byte memory is stored at least one word, each of which consists of a plurality of bytes. The digital signal processor includes an external memory controller, a byte DMA controller, a steal request priority scheduler, and an internal memory. The external memory controller is coupled with the common data bus. The byte DMA controller is coupled with the external memory controller and includes: a byte DMA request circuit for outputting a read request into the external memory controller; a byte DMA waiting circuit for periodically outputting a waiting end signal into the external memory controller; a data buffer for receiving the at least one word stored in the byte memory during an execution of the read request; and a byte DMA steal request circuit for outputting a read steal request after the data buffer has received the at least one word stored in the byte memory. The steal request priority scheduler receives the read steal request, makes a schedule for an execution of the read steal request, and outputs a steal acknowledgement into the external memory controller during the execution of the read steal request. The internal memory is coupled with the data buffer for receiving in format of a word the at least one word stored in the data buffer during the execution of the read steal request. The external memory controller makes a schedule for the execution of the read request. During the execution of the read request, the external memory controller in response to the waiting end signal transfers in format of a byte the at least one word from the byte memory through the common data bus into the data buffer.

The digital signal processor according to the present invention allows the byte DMA controller to perform byte DMA operations to the byte memory through the common data bus by controlling the external memory controller, resulting in less connecting terminals than the conventional digital signal processor, thereby achieving a size reduction.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 2:
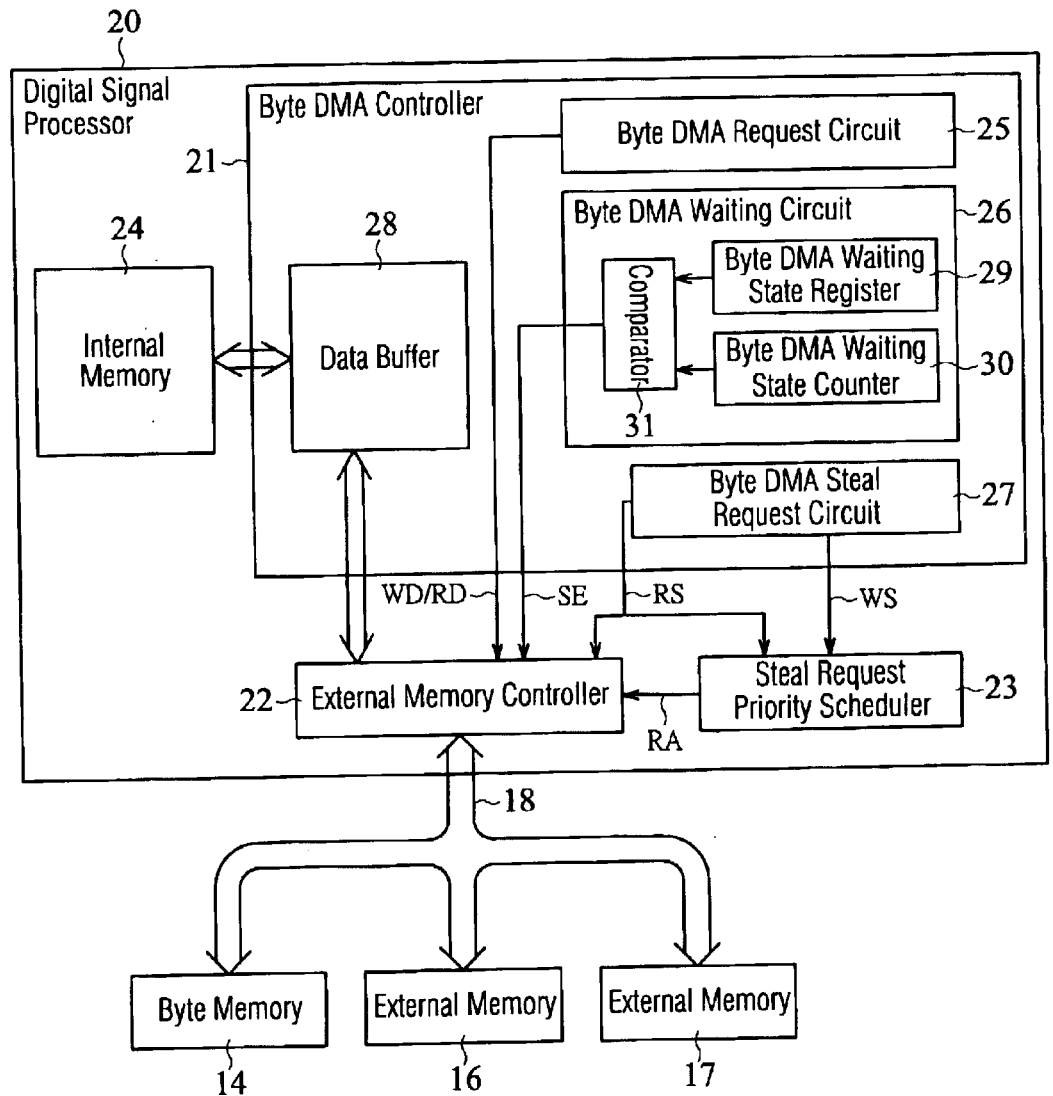
FIG. 2 is a circuit block diagram showing a digital signal processor with a byte DMA controller according to the present invention.

FIG. 2 is a circuit block diagram showing a digital signal processor 20 with a byte DMA controller 21 according to the present invention. Referring to FIG. 2, in addition to the byte DMA controller 21, the digital signal processor 20 further includes an external memory controller 22, a steal request priority scheduler 23, and an internal memory 24. The byte DMA controller 21 includes a byte DMA request circuit 25, a byte DMA waiting circuit 26, a byte DMA steal request circuit 27, and a data buffer 28. The byte DMA waiting circuit 26 includes a byte DMA waiting state register 29, a byte DMA waiting state counter 30, and a comparator 31.

In the present invention, the byte DMA controller 21 is coupled with the external memory controller 22 which is coupled with the byte memory 14 and the external memories 16 and 17 through a common data bus 18. With such configuration, the byte DMA controller 21 can perform byte DMA operations to the byte memory 14 through the common data bus 18 by controlling the external memory controller 22, without the use of the dedicated data bus 13 shown in FIG. 1. As a result, the digital signal processor 20 according to the present invention has less connecting terminals than the conventional digital signal processor 10 shown in FIG. 1, thereby achieving a size reduction. Hereinafter are described in detail a DMA write operation and a DMA read operation of the digital signal processor 20 according to the present invention with reference to FIG. 2. In the specification, the terminology "DMA write operation" indicates an operation of transferring data stored in the internal memory 24 into the byte memory 14 while the terminology "DMA read operation" indicates an operation of transferring data stored in the byte memory 14 into the internal memory 24.

Now is described in detail the DMA write operation of the digital signal processor 20 with reference to FIG. 2. At first, the DMA steal request circuit 27 outputs a write steal request WS into the steal request priority scheduler 23. The steal request priority scheduler 23 makes a schedule for execution of the write steal request WS. When an execution order turns to the write steal request WS, data stored in the internal memory 24 are transferred in format of a word into the data buffer 28 of the byte DMA controller 21. For example, a word consists of three or more bytes.

The byte DMA request circuit 25 outputs a byte DMA write request WD into the external memory controller 22. The external memory controller 22 makes a schedule for execution of the byte DMA write request WD. More specifically, in the present invention, the external memory controller 22 sets a lowest priority to the execution of the byte DMA write request. When an execution order turns to the byte DMA write request WD, the external memory controller 22 causes the data stored in the data buffer 28 to be transferred in format of a byte into the byte memory 14 through the common data bus 18. In other words, assuming that the data stored in the data buffer 28 is a word consisting of three bytes, the external memory controller 22 must repeat three times the one-byte-per-time transferring in order to completely transfer the data stored it the data buffer 28 into the byte memory 14. In order to ensure that there is enough time for the byte to be successfully transferred from the data buffer 28 into the byte memory 14 during every byte transferring operation, the byte DMA waiting circuit 26 outputs a waiting end signal SE with a programmed period into the external memory controller 22 for enabling the external memory controller 22 to person the byte transferring operation between the data buffer 28 and the byte memory 14. In other words, within the time interval defined between two sequential waiting end signals SE, the external memory controller is allowed to finish transferring a byte from the data buffer 28 through the common data bus 18 into the byte memory 14.

More specifically, in the byte DMA waiting circuit 26, the byte DMA waiting state register 29 has been previously programmed with a predetermined waiting numeral. The byte DMA waiting state counter 30 has a value incrementing from 0 in synchronization with a clock. The comparator 31 makes a comparison between the predetermined waiting numeral from the byte DMA waiting state register 29 and the value from the byte DMA waiting stale counter 30. As soon as the value from the byte DMA waiting state counter 30 is incremented to equal the waiting numeral, the comparator 31 outputs the waiting end signal SE into the external memory controller 22. On the other hand, the value of the byte DMA waiting state counter 30 is reset to 0 for next cycle of incrementing in synchronization with the clock. From the description above, it is appreciated that the predetermined numeral according to the present invention depends on the time required by transferring one byte between the data buffer 28 and the byte memory 14 in a practical circuit application.

After the execution of the byte DMA write request WD completes, the external memory controller 22 restores to an initial state for scheduling the upcoming byte DMA write requests and other requests input thereto.

Now is described in detail the DMA read operation of the digital signal processor 20 with reference to FIG. 2. At first, the DMA request circuit 25 outputs a byte DMA read request RD into the external memory controller 22. The external memory controller 22 makes a schedule for execution of the byte DMA read request RD. More specifically, in the present invention, the external memory controller 22 sets a lowest priority to the execution of the byte DMA read request RD. When an execution order turns to the byte DMA road request RD, the external memory controller 22 causes the data stored in the byte memory 14 to be transferred in format of a byte into the data buffer 28 through the common data bus 18. In other words, assuming that the data stored in the byte memory 14 is a word consisting of three bytes, the external memory controller 22 must repeat three times the one-byte-per-time transferring in order to completely transfer the data stored in the byte memory 14 into the data buffer 28. In order to ensure that there is enough time for the byte to be successfully transferred firm the byte memory 14 into the data buffer 28 during every byte transferring operation, the byte DMA waiting circuit 26 outputs a waiting end signal SE with a programmed period into the external memory controller 22 for enabling the external memory controller 22 to perform the byte transferring operation between the byte memory 14 and the data buffer 28. In other words, within the time interval defined between two sequential waiting end signals SE, the external memory controller is allowed to finish transferring a byte from the byte memory 14 through the common data bus 18 into the data buffer 28.

After the data stored in the byte memory 14 is transferred into the data buffer 28, the byte DMA steal request circuit 27 outputs a read steal request RS into the external memory controller 22 and the steal request priority scheduler 23. In response to the read steal request RS, the external memory controller 22 transformed into a state waiting for an acknowledgement of the steal read request RS. On the other hand, the steal request priority scheduler 23 makes a schedule for execution of the read steal request RS. When an execution order turns to the read steal request RS, the steal request priority scheduler 23 outputs a read steal acknowledgement RA into the external memory controller 22 and, at the same time, the data stored in the data buffer 28 are transferred in format of a word into the internal memory 24.

In response to the read steal acknowledgement RA, the external memory controller 22 restores to the initial state for scheduling the upcoming byte DMA write requests and other requests input thereto.

Figure 1:
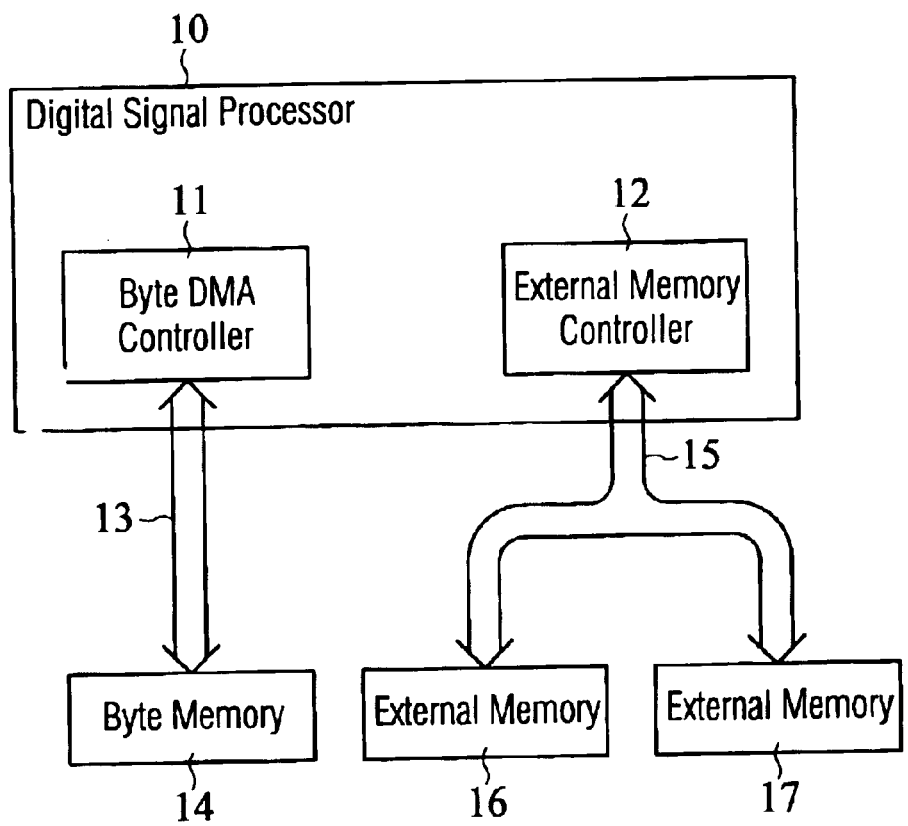
FIG. 1 is a circuit block diagram showing a conventional digital signal processor.

From the description above, it is appreciated that the digital signal processor 20 according to the present invention allows the byte DMA controller 21 to perform byte DMA operations to the byte memory 14 through the common data bus 18 by controlling the external memory controller 22, without the use of the dedicated data bus 13 shown in FIG. 1. As a result, the digital signal processor 20 according to the present invention has less connecting terminals than the conventional digital signal processor 10 shown in FIG. 1, thereby achieving a size reduction.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A digital signal processor coupled with a byte memory and an external memory through a common data bus, comprising:
   an internal memory stored with at least one word, each of which consists of a plurality of bytes;
   an external memory controller coupled with the common data bus;
   a byte direct memory access (DMA) controller coupled with the external memory controller, including:
      a byte DMA steal request circuit for outputting a write steal request;
      a data buffer coupled with the internal memory for receiving in format of a word the at least one word stored in the internal memory during an execution of the write steal request;
      a byte DMA request circuit for outputting a write request into the external memory controller after the data buffer has received the at least one word stored in the internal memory; and
      a byte DMA waiting circuit for periodically outputting a waiting end signal into the external memory controller at the end of a programmed period; and
   a steal request priority scheduler for receiving the write steal request and making a schedule for the execution of the write steal request, wherein:
   the external memory controller makes a schedule for an execution of the write request, and
   during the execution of the write request, the external memory controller in response to the waiting end signal transfers in format of a byte the at last one word from the data buffer through the common data bus into the byte memory.

2. The digital signal processor according to claim 1, wherein the external memory controller sets a lowest priority to the execution of the write request.

3. The digital signal processor according to claim 1, wherein the waiting end signal is output in such a long enough period that the external memory controller is allowed to finish transferring a byte from the data buffer through the common data bus into the byte memory.

4. The digital signal processor according to claim 1, wherein after the execution of the write request completes, the external memory controller restores to an initial state for scheduling an upcoming write request.

5. The digital signal processor according to claim 1, wherein the byte DMA waiting circuit includes:
   a byte DMA waiting state register programmed with a predetermined numeral;
   a byte DMA waiting state counter for incrementing a value from 0 in synchronization with a clock;
   a comparator for comparing the predetermined waiting numeral from the byte DMA waiting state register and the value from the byte DMA waiting state counter,
   wherein the comparator outputs the waiting end signal into the external memory controller as soon as the value from the byte DMA waiting state counter is incremented to equal the waiting numeral.

6. A digital signal processor coupled with a byte memory and an external memory through a common data bus, in which at least one word is store in the byte memory and each of the at least one word consists of a plurality of bytes, the digital signal processor comprising:
   an external memory controller coupled with the common data bus;
   a byte direct memory access (DMA) controller coupled with the external memory controller, including:
      a byte DMA request circuit for outputting a read request into the external memory controller;
      a byte DMA waiting circuit for periodically outputting a waiting and signal into the external memory controller at the end of programmed period;
      a data buffer for receiving the at least one word stored in the byte memory during an execution of the read request; and
      a byte DMA steal request circuit for outputting a read steal request after the data buffer has received the at least one word stored in the byte memory;
   a steal request priority scheduler for receiving the read steal request, making a schedule for an execution of the read steal request, and outputting a steal acknowledgement into the external memory controller during the execution of the read steal request; and
   an internal memory coupled with the data buffer for receiving in format of a word the at least one word stored in the data buffer during the execution of the read steal request, wherein:
   the external memory controller makes a schedule for the execution of the read request, and
   during the execution of the read request, the external memory controller in response to the waiting end signal transfers in format of a byte the at least one word from the byte memory through the common data bus into the data buffer.

7. The digital signal processor according to claim 6, wherein the external memory controller sets a lowest priority to the execution of the read request.

8. The digital signal processor according to claim 6, wherein the waiting end signal is output in such a long enough period that the external memory controller is allowed to finish transferring a byte from the byte memory through the common data bus into the data buffer.

9. The digital signal processor according to claim 6, wherein the external memory controller in response to the read steal request transforms into a state waiting for an acknowledgement of the read steal request.

10. The digital signal processor according to claim 6, wherein the external memory controller in response to the acknowledgement of the read steal request restores to an initial state for scheduling an upcoming read request.

11. The digital signal processor according to claim 6, wherein the byte DMA waiting circuit includes:

a byte DMA waiting state register programmed with a predetermined numeral;

a byte DMA waiting state counter for incrementing a value from 0 in synchronization with a clock; and a comparator for comprising the predetermined waiting numeral from the byte DMA waiting state register and the value from the byte DMA waiting state counter, wherein the comparator outputs the waiting end signal into the external memory controller as soon as the value from the byte DMA waiting state counter is incremented to equal the waiting numeral.

\* \* \* \* \*